Figure 1:
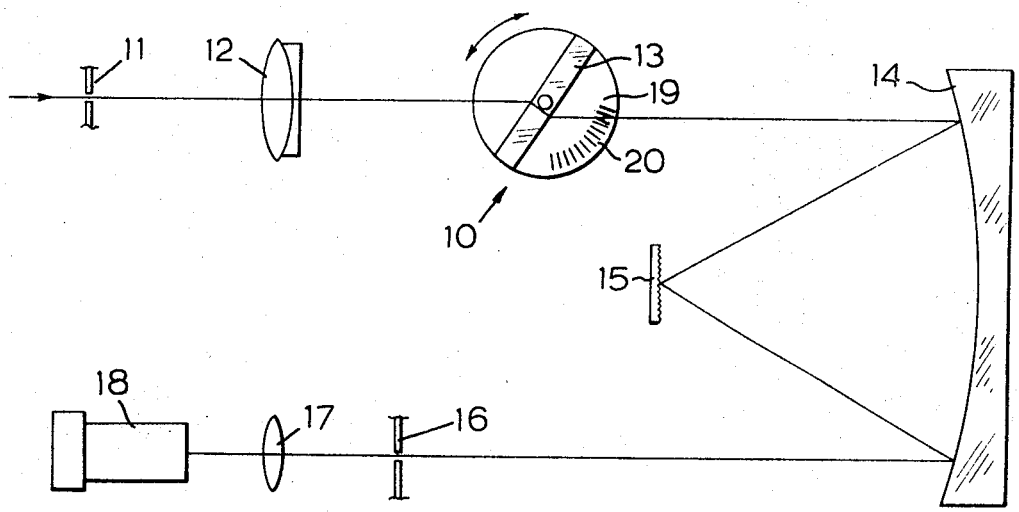

United States Patent

[11] 3,594,083

[72] Inventor Anthony Rene Barringer
 Willowdale, Ontario, Canada
[21] Appl. No. 839,718
[22] Filed July 7, 1969
[45] Patented July 20, 1971
[73] Assignee Barringer Research Limited
 Rexdale, Ontario, Canada

[54] SPECTROMETER
 9 Claims, 5 Drawing Figs.
[52] U.S. Cl. .................................................. 356/83,
 356/98
[51] Int. Cl. ................................................. G01j 3/42,
 G01j 3/06
[50] Field of Search........................................ 250/43.5;
 356/51, 74, 83, 84, 96—101

[56] References Cited
 UNITED STATES PATENTS
3,385,160 5/1968 Dawson et al. ............... 356/96
3,486,822 12/1969 Harris.......................... 356/83

FOREIGN PATENTS
1,338,403 10/1963 France .............................. 356/97

OTHER REFERENCES
 Dawson et al.: " An Automatic High Speed Scanning Multichannel Spectrophotometer for Spectrochemical Analysis," SPECTROCHIMICA ACTA, Vol. 23B, No. 11, Nov. 1968, pages 695— 708

Primary Examiner—Ronald L. Wibert
Assistant Examiner—F. L. Evans
Attorney—Rogers, Bereskin & Parr ABSTRACT: A scanning spectrometer having means for scanning entrance slit images across an exit slit. A predetermined spectrum is recorded photographically or magnetically, and means synchronized with the scanning means is provided for obtaining correlation signals from the recorded spectrum. The correlation signals are precisely synchronized with the scanning means, and are used for correlation with the light passing through the exit slit.

PATENTED JUL20 1971  3,594,083

INVENTOR.
ANTHONY R. BARRINGER
BY Rogers, Bereskin, & Parr

SPECTROMETER

This invention relates to the art of spectrochemical analysis, and in particular to a spectrometer for analyzing gases and vapors having characteristic absorption lines or bands.

Spectrochemical analysis refers to the chemical identification and quantitative analysis of matter by means of emission and absorption spectra that are uniquely characteristic of atoms and molecules. The positions and intensities of the spectra characterize the atoms or molecules that produce them. The word spectra includes line spectra that are characteristic of atoms and ions and band spectra that are characteristic of molecular gases and chemical compounds.

A conventional spectrometer essentially consists of an entrance slit, a collimator, means for dispersing the light to separate the constituent wavelengths of the light, a focusing element to produce images of the entrance slit at positions corresponding to the constituent wavelengths, an exit slit positioned in the plane where the images are formed, and a photodetector for indicating the intensity of the light passing through the exit slit. In order to identify the existence of a particular gas or vapor having a complex spectrum, the dispersed light is examined at a number of wavelengths corresponding to the wavelengths of known spectral lines of the particular gas or vapor. One prior type of spectrometer employed a number of exit slits each positioned at the location of a particular spectral line. A photomultiplier was placed behind each exit slit, and the outputs of the photodetectors were compared. Although measurements can be made with this type of spectrometer more quickly than with conventional photographic spectrometers (wherein the spectrum is photographed and subsequently compared with a master spectrum containing all the spectral lines of interest), this type of spectrometer is relatively bulky, costly, and inflexible. A new form of spectrometer is described in U.S. application Ser. No. 654,202 now U.S. Pat. No. 3,518,002 of A. R. Barringer et al. entitled Spectrometer. The spectrometer described in the above application is provided with a mask in the plane where the spectra are formed, and the light beam passing through the spectrometer. The mask is positioned in a plane where spectra are formed, and the light beam passing through the spectrometer is vibrated in the direction of the dispersion of the light so that the spectra sweep across the lines of the mask. The intensity of the light passing through the mask is varied only when the spectra correlate with the lines of the mask, and the intensity variations are analyzed to indicate the concentration of the gas or vapor giving rise to the spectra. This spectrometer is extremely sensitive and has relatively high light throughput.

The present invention, like the spectrometer described above, is of the correlation type, but instead of employing a mask positioned in the plane of the spectra, the usual exit slit is employed, and correlation is achieved electronically, from spectral information stored on a piece of film, magnetic tape, or other known recording means. More particularly, in a preferred form of the present spectrometer the light beam passing through the spectrometer is vibrated slightly, at a constant frequency. A rotatable plane parallel optical flat or refractor plate can be used for vibrating the light beam. Attached to the refractor plate is a transparent disc which contains a series of radial lines near its circumference. A photodetector is positioned on one side of the lines, and a small light source on the other, so that as the refractor plate is oscillated to-and-fro a train of pulses (hereinafter called correlation signals) appears at the output of the photodetector.

When light containing the characteristic spectra of a particular gas (such as $SO_2$) passes through the spectrometer, the light emerging from the exit slit is modulated in intensity in accordance with the known spectrum of the gas. The emergent light is converted into an electrical signal by a photodetector positioned behind the exit slit. The said electrical signal then is correlated with the correlation signals; if correlation exists, an output signal is derived, the amplitude of which is a function of the intensity of the spectra. If the incoming light does not contain the characteristic spectra corresponding to the correlation lines on the disc, correlation will not occur to any substantial extent. The output signal is integrated, and if correlation does not exist, noncorrelative signals will tend to integrate to zero.

Figure 2:
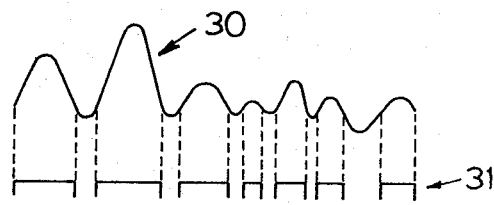
Figure 3:
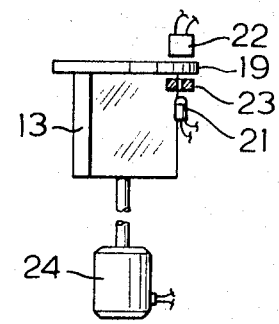

The word "light" used in the following specification includes not only visible light but also invisible light such as ultraviolet and infrared. Substances which can be detected by the correlation technique referred to above include the halogens, sulfur dioxide, nitrogen dioxide, and in general any other elements and compounds having a plurality of absorption lines or bands In the drawings, FIG. 1 is a diagrammatic view showing the principal optical elements of a preferred form of spectrometer, utilizing a diffraction grating for dispersion, FIG. 2 is a graphical view showing correlative signals, FIG. 3 is a side view of a preferred arrangement used for producing correlation signals, FIG. 4 is a block diagram showing a preferred form of an electronic signal processing system used with the spectrometer of FIG. 1, and FIG. 5 is a perspective view of an alternative arrangement for producing correlation signals, utilizing magnetic tape.

Referring to FIG. 1, light incident upon spectrometer 10 enters through an entrance slit 11 and is collimated by a lens 12. The light passes through a rotatable refractor plate or optical flat 13, and is reflected off a concave mirror 14 towards a grating 15. The light (which is now dispersed into its constituent wavelengths) is then reflected towards the mirror 14, and finally is reflected back to an exit slit 16. Light emerging from the exit slit 16 is focused by a lens 17 onto the sensitive face of a photodetector 18 such as a photomultiplier, photodiode, photoresistor, photovoltaic cell or the like. A conventional filter (not shown) is preferably positioned in the light path to attenuate light of wavelengths outside the wavelength region of interest. When the light entering the spectrometer contains spectra, spectral images are formed in the plane of the exit slit. As the refractor plate 13 rotates to and fro, the spectra are swept or scanned past the exit slit.

A circular transparent disc 19 is removably secured to the refractor plate 13 and it is located outside of the path of the beam travelling between the lens 12 and the mirror 14. A plurality of radial correlation lines 20 is provided around the periphery of the disc 19. Correlation signals are derived from the correlation line 20 by the arrangement shown in FIG. 3 wherein the light from a small lamp 21 shines through the disc 19 and falls upon a photodetector 22. The photodetector 22 is a photosensitive transducer such as a light sensitive field effect transistor, photoresistor, photovoltaic cell, photodiode or the like. As the disc 19 is rotated, the moving correlation lines 20 cause the light shining upon the photodetector 22 to be modulated. Accordingly, the output of the photodetector 22 consists of a train of electrical pulses (herein called correlation signals) the nature of which depends upon the spacing and density of the correlation lines 20. In order to improve correlation, a fine slit 23 preferably is interposed between the lamp 21 and the disc 19. The refractor plate 13 is angularly oscillated by a torque motor 24. Several tracks or bands of different sets of correlation lines 20 can be disposed on the disc 19, with separate lamps 21, photodetectors 22 and associated pulse forming circuits for each set of correlation lines 20.

Figure 4:
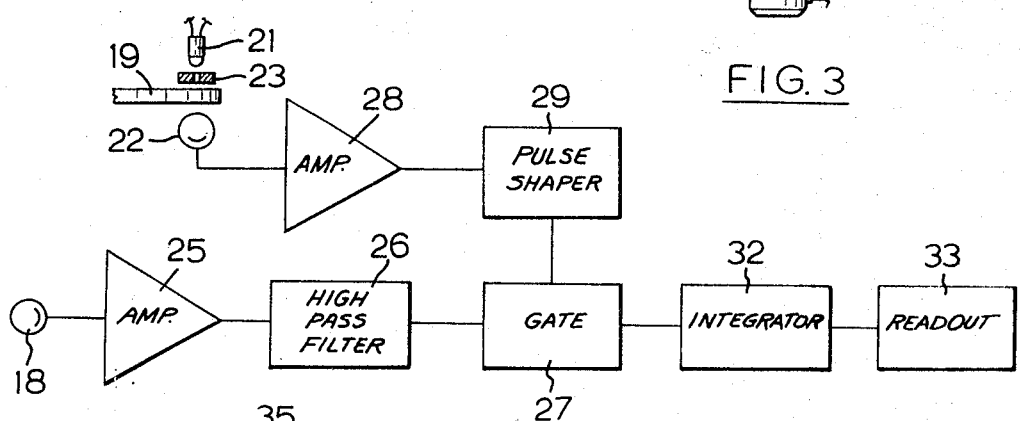
Figure 5:
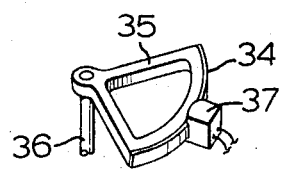

Referring now to FIG. 4, the output of the photodetector 18 consists of a DC voltage and an AC voltage attributable to the spectra which are swept past the exit slit 16. The output of the photodetector 18 is amplified by an amplifier 25. Any DC or slowly fluctuating AC component is blocked by a high-pass filter 26 having a cutoff frequency of, for example, 5 Hz. or less. The output of the high-pass filter 26, which consists of an AC voltage containing spectral information, is fed to a gate 27. The gate 27 is opened at periodic intervals in accordance with the correlation signals derived from the correlation lines 20 on the disc 19, as follows. The output of the photodetector 22, which includes an AC voltage caused by the modulation of the light from the lamp 21 as the correlation lines 20 are swept past the lamp, is amplified by an amplifier 28 and then is fed to a pulse shaper 29 which provides clean gating pulses for controlling the gate 27.

Referring to the waveforms shown in FIG. 2, a typical AC voltage from the high-pass filter 26 is indicated generally by reference numeral 30, and corresponding gating pulses from the pulse shaper 29 are indicated generally by reference numeral 31. The AC voltage 30 shown in FIG. 1 represents a complex spectrum of a particular gas. It will be noted that the gating pulses 31 coincide with each positive-going portion of the AC voltage 30. Accordingly, when the positive-going portions of the AC voltage 30 coincide with the gating pulses 31, correlation is achieved. The output of the gate 27 is fed to an integrator 32, the output of which is indicated by any suitable readout means 33 such as a meter, recorder or the like. When the AC voltage 30 correlates exactly with the gating pulses 31, the output of the gate 27 is coherent and the integrator 32 will produce a DC output voltage which is indicated by the readout means 33. However, if the AC voltage 30 does not correlate with the gating pulses 31, the output of the gate 27 is integrated out by the integrator 32, and the output of the integrator 32 then is zero or close to zero. If desired, correlation can be made with negative-going portions of the AC voltage 30 by providing an additional gate which is adapted to open during intervals between the gating pulses 31. The outputs of each gate then would be fed to the respective inputs of a differential amplifier.

The correlation lines 20 can be prepared photographically by depositing a photographic emulsion on the disc 19 and exposing it to light pulses through the slit 23, as the refractor plate 13 is being rotated. The light pulses may be produced by the lamp 21 which then is connected to the output of the high-pass filter 27. Thus a series of lines are formed on the periphery of the disc 19 corresponding to the maxima in the output of the photodetector 18. It is preferable to amplify the output of the photodetector 18 as much as possible in preparing the correlation lines 20 and then to feed the amplified signal through a limiting circuit so that the voltage applied to the lamp 21 consists of square wave pulses.

The spectrometer can be calibrated for the characteristic absorption spectrum of a particular gas, by placing a cell containing a sample of the gas in front of the entrance slit of the spectrometer, with a suitable broad band light source projected through the gas into the spectrometer. The photographic emulsion on the disc 19 is then exposed in the manner indicated above, and the resulting correlation lines 20 on the disc 19 are then characteristic of the particular gas contained within the cell. When the same disc is used for analyzing gas or vapor of unknown composition, the degree of cross-correlation, indicated by the level of the output of the integrator 32, is a function of the amount of the particular gas present in the unknown sample. By suitably calibrating the spectrometer with known gases and vapors of various densities it is possible to measure the density of the particular gas present in an unknown sample.

Instead of using photographic emulsion or film for recording the correlation lines 20, it will be understood that a magnetic drum or a strip of magnetic tape secured to any suitable rotatable support can be substituted for the disc 19 with its correlation lines 20. The correlation "lines " would then be recorded magnetically instead of photographically. A disadvantage of this arrangement, however, is that considerably less information can be recorded in the same space as can be recorded photographically. However, a magnetic drum or tape may be convenient for rapid and simple programming and it is possible to change the recorded pattern very easily. The arrangement shown in FIG. 5 is convenient when a magnetic tape is used. A strip of magnetic tape 34 is attached to a nonmagnetic sector shaped member 35. A shaft 36 connects the refractor plate 13 to the member 35 so that the latter is angularly oscillated together with the refractor plate 13. A conventional record play back head 37 replaces the photodetector 22 shown in FIGS. 1 and 3, and its function is to record and play back information on the magnetic strip 34.

The output of the integrator 32 can be normalized for long term variations of the intensity of the light entering the spectrometer (e.g. due to variations in source intensity in the case of a lamp source, or changing atmospheric conditions when daylight is used as the source). This can be done for example by utilizing a photomultiplier as the photodetector 18, and varying the high voltage applied to the photomultiplier to maintain the average direct current output of the photomultiplier at a constant level.

Although only one set of correlation lines 20 has been shown, it will be understood that a plurality of sets can be used, one set for each gas of interest. A number of separate sets of correlation signals would then be derived, and a corresponding number of gates 27 would be employed, each gate being connected to the output of the filter 26 and each respectively being synchronized by one of the sets of correlation signals. Separate integrators and readout circuits would be provided for each gate so that simultaneous observations can be made of the correlation against a number of spectra.

Alternative methods of cyclically oscillating the spectrum can be employed. For example, reflective elements in the spectrometer can be oscillated or the grating 15 itself. Alternatively, the entrance or exit slits can be oscillated from side to side and connected directly to a high-resolution mask and an optical system which can generate correlation signals.

Improved light throughput can be obtained by using a multiple entrance slit of complex pattern and matching exit slit of similar pattern. This method of achieving increased light throughput has been described by A. Girard, Applied Optics, Vol. 2, Page 79 (1963). The complex grill pattern used at the entrance slit is cross correlated against the grill pattern at the exit slit and the system generates a DC voltage on top of which is superimposed the spectral pattern that would normally be obtained if only a single entrance and exit slit were used.

I claim:
1. A spectrometer comprising:
an entrance slit,
means for dispersing light passing through the entrance slit to resolve the characteristic spectra of a particular substance when the characteristic spectra are present in the light,
focusing mean for producing a set of images of the entrance slit corresponding to said characteristic spectra, the slit images being dispersed in a given direction of dispersion and being formed in a focal plane,
an exit slit positioned in said focal plane,
means for cyclically scanning said entrance slit images across said exit slit in a predetermined manner,
a photodetector positioned for receiving light which has passed through said exit slit, the photodetector producing a train of time varying electrical signals proportional to the intensity of the light shining upon it,
spectrum characterizing means for producing a train of time varying correlation signals which are precisely synchronized with said scanning means, said correlation signals being representative of said characteristic spectra,
means for correlating said electrical signals with said correlation signals, said correlating means producing an output signal only when each component of said electrical signals is correlative with a corresponding component of said correlation signals, and
means for indicating said output signal.

2. A spectrometer as claimed in claim 1 wherein said scanning means comprises a rotatable optical element positioned in the path of the light passing through the spectrometer so that rotation of the optical element causes the positions of said slit images to be varied, and means for rotating said optical element.

3. A spectrometer as claimed in claim 2 wherein said spectrum characterizing means includes a transparent device rigidly coupled to said optical element, said device having a pattern of opaque lines with transparent spaces between the lines, said pattern being representative of said characteristic spectra and means for deriving said correlation signals from said pattern of lines as said optical element is rotated.

4. A spectrometer as claimed in claim 2 wherein said spectrum characterizing means further includes a lamp positioned on one side of said device and a photodetector positioned on the other side of said device so that the light shining upon the device from the lamp is modulated as said optical element is rotated.

5. A spectrometer as claimed in claim 4 wherein said correlating means includes an electronic gate which is controlled by said correlation signals.

6. A spectrometer as claimed in claim 5 wherein said indicating means includes an integrator for integrating the output of said gate and means for indicating the output of said integrator.

7. A spectrometer as claimed in claim 2 wherein said spectrum characterizing means includes a strip of magnetic tape having correlation signals recorded thereon, said strip being secured to a support which is coupled to said optical element, and a magnetic play back head positioned next to said strip for receiving the correlation signals as said optical element is rotated.

8. A spectrometer as claimed in claim 7 wherein said correlating means includes an electronic gate which is controlled by said correlation signals.

9. A spectrometer as claimed in claim 8 wherein said indicating means includes an integrator for integrating the output of said gate and means for indicating the output of said integrator.